(12) United States Patent
Powlesland et al.

(10) Patent No.: US 7,536,919 B2
(45) Date of Patent: May 26, 2009

(54) STRAIN GAUGE

(75) Inventors: Ian Powlesland, Kallista (AU); Alan Wilson, Glen Iris (AU)

(73) Assignee: The Commonwealth of Australia - Department of Defence, Canberra (AU)

( * ) Notice: Subject to any disclaimer, the term of this patent is extended or adjusted under 35 U.S.C. 154(b) by 0 days.

(21) Appl. No.: 10/581,355

(22) PCT Filed: Dec. 1, 2004

(86) PCT No.: PCT/AU2004/001687

§ 371 (c)(1),
(2), (4) Date: Jan. 18, 2007

(87) PCT Pub. No.: WO2005/054777

PCT Pub. Date: Jun. 16, 2005

(65) Prior Publication Data

US 2007/0186664 A1    Aug. 16, 2007

(30) Foreign Application Priority Data

Dec. 5, 2003    (AU) .............................. 2003906777

(51) Int. Cl.
*G01B 7/16* (2006.01)
(52) U.S. Cl. ...................................................... 73/777
(58) Field of Classification Search ............ 73/760–777
See application file for complete search history.

(56) References Cited

U.S. PATENT DOCUMENTS

| | | | | |
|---|---|---|---|---|
| 3,568,124 A | * | 3/1971 | Sonderegger | 338/4 |
| 3,624,714 A | * | 11/1971 | Frassrand | 73/148 |
| 4,166,269 A | | 8/1979 | Stephens et al. | |
| 4,445,385 A | | 5/1984 | Endo | |
| 4,739,848 A | * | 4/1988 | Tulloch | 177/211 |
| 4,745,812 A | * | 5/1988 | Amazeen et al. | 73/862.041 |
| 5,092,177 A | | 3/1992 | Varacca | |
| 5,225,705 A | * | 7/1993 | Hiyama et al. | 257/415 |
| 5,264,820 A | | 11/1993 | Kovacich et al. | 338/42 |
| 5,402,684 A | * | 4/1995 | Engeler et al. | 73/794 |
| 5,412,986 A | * | 5/1995 | Beringhause et al. | 73/514.33 |
| 5,698,785 A | * | 12/1997 | Rich et al. | 73/514.33 |
| 6,056,888 A | * | 5/2000 | August | 216/16 |
| 6,422,088 B1 | * | 7/2002 | Oba et al. | 73/754 |
| 6,487,906 B1 | * | 12/2002 | Hock | 73/379.01 |
| 6,618,217 B2 | * | 9/2003 | Heaton et al. | 360/77.03 |

(Continued)

FOREIGN PATENT DOCUMENTS

CH    517 300    2/1972

(Continued)

*Primary Examiner*—Max Noori
(74) *Attorney, Agent, or Firm*—Stites & Harbison PLLC; Douglas E. Jackson

(57) ABSTRACT

A strain gauge (10), comprising a silicon strain sensing element (14) for sensing strain with first and second load points (16) and provided with a pair of piezo-resistors (22) located between said load points such that, when said strain sensing element (14) is subjected to tension or compression at said load points, a first of said pair of piezo-resistors (22a, 22b) is subjected to compression and a second of said pair of piezo-resistors (22a, 22b) is subjected to tension, wherein a change in relative resistance of said pair of piezo-resistors is induced by subjecting said strain sensing element to compression or tension.

45 Claims, 4 Drawing Sheets

U.S. PATENT DOCUMENTS

| | | | |
|---|---|---|---|
| 6,928,879 B2 * | 8/2005 | Partridge et al. | 73/754 |
| 7,086,290 B2 * | 8/2006 | Parker et al. | 73/754 |
| 7,318,351 B2 * | 1/2008 | Cobianu et al. | 73/715 |

FOREIGN PATENT DOCUMENTS

| | | |
|---|---|---|
| EP | 0 454 901 | 6/1994 |
| GB | 1 344 758 | 1/1974 |
| GB | 2 174 500 | 11/1986 |
| JP | 03-037534 | 2/1991 |

* cited by examiner

STRAIN GAUGE

FIELD OF THE INVENTION

The present invention relates to a strain gauge for measuring strain, of particular but by no means exclusive application in measuring strain in cramped environments.

BACKGROUND OF THE INVENTION

One existing type of strain gauge is the electrical resistance foil strain gauge. For uniaxial strain these typically require bridge completion and precision conditioning equipment. Further, electrical resistance foil strain gauges generally use higher power levels than is desirable and their use involves careful work by personnel owing to their low output signal levels.

Another broad type of gauge is the "clip" gauge, which incorporate a full bridge. However, clip gauges generally do not have a low profile, and are unsuitable for permanent installation. Further, they also consume considerable power and are relatively expensive.

Columbia Research Laboratories, Inc. produces a full bridge product using metallic gauges, but this does not have as high a sensitivity as is desirable in many applications.

Thus, existing strain gauges have relatively high power requirements, generally require bridge completion, and have low output signal levels.

SUMMARY OF THE INVENTION

The present invention provides, therefore, a strain gauge, having:
  a silicon strain sensing element for sensing strain with first and second load points and provided with a pair of piezo-resistors located between said load points such that, when said strain sensing element is subjected to tension or compression at said load points, a first of said pair of piezo-resistors is subjected to compression and a second of said pair of piezo-resistors is subjected to tension;
  wherein a change in relative resistance of said pair of piezo-resistors is induced by subjecting said strain sensing element to compression or tension.

Preferably said strain sensing element comprises a curved silicon member (preferably a ring and more preferably a circular ring or annulus).

Those skilled in the art will understand that structures other than circular members can be used to generate compressive and tensile regions in silicon suitable for measuring using piezo-resistors. For example, alternatives include ellipses, ovals, one or more curves with one or more straight portions, and angular members (such as a "V" shape or a zig-zag member).

In one particular embodiment, the strain sensing element comprises a silicon ring or annulus.

The strain sensing element may include two or more load points and respective sets of piezo-resistors between each respective pair of load points. For example, the strain sensing element may comprise a ring with two load points and two pairs of piezo-resistors.

Preferably the strain sensing element comprises a silicon ring or annulus with a plurality of load points spaced substantially equidistantly around the perimeter of said ring or annulus.

The strain gauge may include a plurality of strain sensing elements (such as silicon rings or annuli). Preferably each of said strain sensing elements include at least one load point coupled to a load point of another of said strain sensing elements.

In one embodiment, the strain gauge includes a plurality of strain sensing elements (such as silicon rings or annuli) arranged linearly, in a ring or other desired geometry each having a load point coupled to or common with a load point of any adjacent one or more of said strain sensing elements.

Preferably said gauge includes a detector responsive to changes in the relative resistance of said pair of piezo-resistors.

Preferably said strain sensing element is provided with two pairs of piezo-resistors, arranged so as to constitute a Wheatstone Bridge.

In one particular embodiment, the strain sensing element is provided with a plurality of pairs of piezo-resistors, arranged so as to constitute a Wheatstone Bridge, and the gauge includes a current or potential sensitive device (such as an microammeter or differential amplifier) arranged to respond to changes in the relative resistance of said piezo-resistors.

The invention also provides a strain gauge incorporating a strain measuring structure fabricated in silicon to measure strain, comprising:
  the strain measuring structure having a plurality of connection members adapted to connect the strain measuring structure to an external structure that in use transmit the strain in the external structure to the strain measuring structure; and
  a compliant structure connected to the connection points by two or more tethers, the compliant structure being configured to translate strain at the connection points to compressive and tensile strains within the compliant structure, said compliant structure comprising piezo-resistors fabricated within the structure for the purpose of detecting compressive and tensile strain in the compliant structure.

Preferably said piezo-resistors are fabricated in pairs so that under compressive load one is in compression and one is in tension and under extensive load the one that was in compression is under tension and the one under tension is under compression.

Preferably piezo-resistors are arranged electronically to reduce changes in resistance due to thermal effects.

In one embodiment the strain gauge further comprises a base structure that does not experience strain and other piezo-resistors fabricated on parts of the base structure and can thus be used as temperature sensors.

Preferably said other piezo-resistors are used in temperature correction for the piezo-resistors of the compliant member.

The strain gauge may comprise means to apply a bias voltage between the strain sensitive piezo-resistors of the compliant member and the substrate or doped well that they are in order to control response of said strain sensitive piezo-resistors.

The strain gauge may be fabricated with conductive tracks to the connection points so that material may be electro-deposited at the connection points to provide a raised point for bonding to an external structure for the purposes of monitoring the strain in the external structure.

The strain gauge may comprise a circular silicon structure with two tethers arranged opposite each other and four piezo-resistors arranged in pairs opposite each other and substantially at right angles to the tether points and connected in a Wheatstone bridge configuration so that there is little or no change in the different voltage of the Wheatstone bridge with change in temperature and there is a change in the difference voltage of the Wheatstone bridge when the structure is under strain.

BRIEF DESCRIPTION OF THE DRAWINGS

In order that the invention may be more clearly ascertained, embodiments will now be described, by way of example, with reference to the accompanying drawings, in which.

DETAILED DESCRIPTION OF THE DRAWINGS

Figure 1:
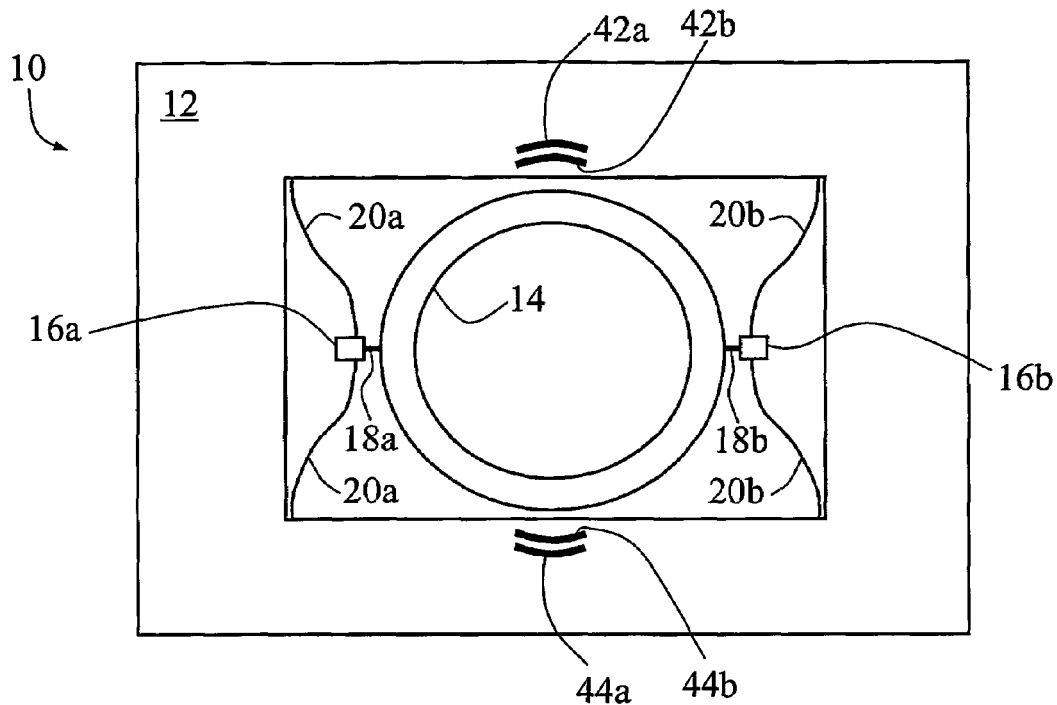
FIG. 1 is a schematic view of a uniaxial strain gauge according to a first embodiment of the present invention.

A uniaxial strain gauge according to an embodiment of the present invention is shown generally at 10 in FIG. 1. The strain gauge 10 comprises a three dimensional, integral machined silicon structure, and includes a rectangular outer silicon frame 12, within which is a strain sensing element in the form of silicon annulus 14. The silicon annulus 14 is attached to two load points 16a, 16b respectively, by means of silicon tethers 18a, 18b at diametrically opposite points on the outer circumference of annulus 14. These load points 16a, 16b are coupled to the silicon frame 12 by means of respective pairs of compliant silicon tethers 20a, 20b. It is by means of load points 16a, 16b that the gauge 10, in use, is bonded to the structure being monitored for strain.

Herein the term "silicon" is used to refer to the base material being silicon. Persons skilled in the art will appreciate that typically the silicon will be "doped" with impurities to improve its ability to carry charge and/or to vary the properties of different portions of the silicon.

In this embodiment, the silicon annulus 14 has an outer diameter 10 mm, a thickness 100 µm and width (i.e. the distance from the inner circumference to the outer circumference) 100 µm.

The strain sensing element, silicon annulus 14, is thus a free standing mechanical structure for measuring load, with that free standing structure attached to a larger frame (viz. silicon frame 12) via compliant tethers 20a, 20b. Fabrication techniques familiar to those skilled in the art are used to form piezo-resistive elements, metal contacts and any electronic circuitry on the silicon wafer. In order to produce the free standing structure a deep etching process, such as deep reactive ion etching, is used. Those skilled in the art will be familiar with this process for forming deep structures in silicon that already has electronic circuitry fabricated on it—e.g. silicon processing lithography and doping techniques.

The strain gauges are fabricated in silicon using techniques to produce substantially 3 dimensional structures with walls and substantially parallel sided cavities that are substantially at right angles to the surface of the silicon. The Bosch (R) deep reactive ion etching process would be one technique to achieve this.

The structures are constructed in such a way that when released from the silicon wafer or an underlying carrying wafer or handle wafer the thickness of the released structures is substantially uniform. One approach to achieve this would be to use silicon-on-insulator wafers with the strain gauge structures on the device side (where the electronics and mechanical structures are formed). The Bosch (R) deep reactive ion etching process stops at the oxide between the device and the handle side thus defining the depth of the mechanical structures.

The final stage of fabrication of such devices is the release of the deep machined structures from the silicon handle layer. This can be performed by complete removal of the handle silicon, by deep etching the handle silicon from the back side of the wafer at regions that correspond to the mechanical structures on the front side of the wafer, or by selective etching of the insulating layer between the device silicon and the handle silicon in the regions where the deep mechanical structures are located. Those skilled in the art will recognize that electrical circuits fabricated previously may need to be protected during this processing and that there are a number of suitable techniques for doing this; in any particular case, the preferred technique will depend on the approach taken to release the mechanical structures.

Those skilled in the state of the art will realize that integrated circuits such as current or voltage amplifiers, analog to digital circuits, interface circuits, communications circuits, micro controller circuits and other circuits could be incorporated on the silicon during the processing before the fabrication of the silicon structure.

Figure 2:
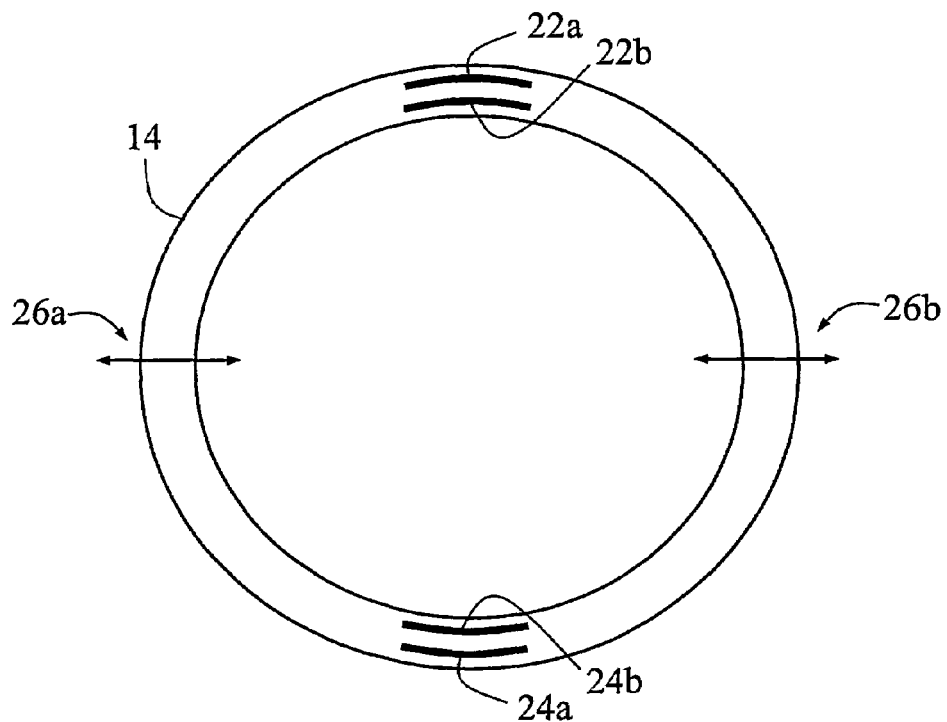
FIG. 2 is a schematic view of the strain sensing element of the strain gauge of FIG. 1.

FIG. 2 is a schematic view of the silicon annulus 14. Annulus 14 is provided with two pairs of identical piezo-resistors 22a,b 24a,b, located at diametrically opposite points on one face of the annulus 12. The four piezo-resistors 22a,b 24a,b are fabricated onto the silicon annulus 14, and are oriented so as to extend parallel to each other and essentially circumferentially to the silicon annulus 14. Each pair of piezo-resistors 22a,b or 24a,b includes a first piezo-resistor (22a and 24a respectively) located near the outer circumference of the silicon annulus 14 and a second piezo-resistor (22b and 24b respectively) located near the inner circumference of the silicon annulus 14.

In broad terms, strain gauge 10 operates as follows. The strain gauge 10 is bonded to the structure to be measured for strain at load points 16a, 16b, and is consequently predominantly in plane with the surface of the structure on which the strain is to be measured. When the load points are subjected to compression or tension, those forces are transmitted, via silicon tethers 18a, 18b, to the silicon annulus 14 at respective diametrically opposite points 26a, 26b of the outer circumference of the annulus 14, 90° from the piezo-resistors 22a,b, 24a,b. This induces the silicon annulus 12 to distort into a marginally elliptical configuration (being either compressed or stretched at points 26a, 26b); as a result, the two outer piezo-resistors 22a, 24a will be respectively either stretched or compressed while the two inner piezo-resistors 22b, 24b will be, respectively, compressed or stretched.

Electrical contacts and connections are made individually to each piezo-resistors 22a,b, 24a,b and taken off the silicon annulus 14 on the flexible silicon tethers 20a, 20b, which are fabricated on the silicon at the same time as the annulus 14. The tethers 18,20 are typically ⅓ to equal to the thickness of the strain sensing element. Those skilled in the art will realize that a number of tether geometries are possible and that both the thickness and total length of the tether are important in determining the compliance of the tether. Tether length can be increased in a confined space by using a geometry that turns back on itself.

Thus, the signals from the piezo-resistors 22a,b, 24a,b are indicative of the strain experienced by the strain gauge 10.

Figure 3:
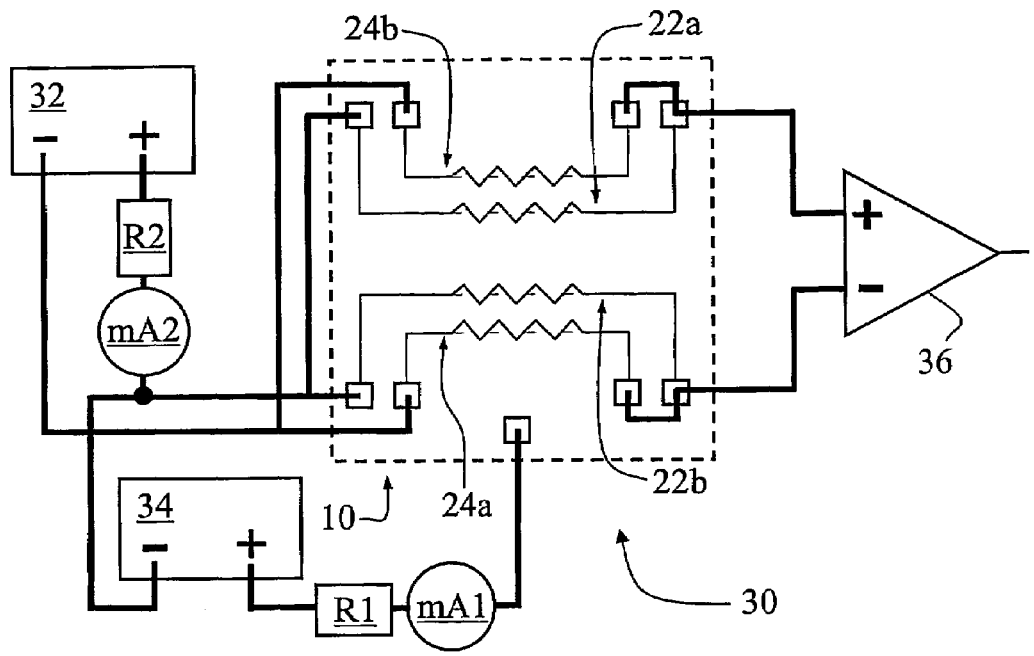
FIG. 3 is a schematic circuit diagram of a strain gauge measurement circuit for use with the strain gauge of FIG. 1.

FIG. 3 is a schematic circuit diagram of a strain gauge measurement circuit 30 for use with strain gauge 10, with a schematic representation of the gauge 10 including piezo-resistors 22a,b, 24a,b. Generally, it will be noted that the piezo-resistors 22a,b, 24a,b and the circuit 30 together constitute a Wheatstone Bridge. The piezo-resistors have substantially equal intrinsic resistances so, when the gauge 10 is under no compression or tension, the Bridge will be substantially balanced. However, when the gauge 10 is under compression (or tension), the outer piezo-resistors 22a, 24a will both be under tension (or respectively compression) and the inner piezo-resistors 22b, 24b will both be under compression (or respectively tension). Consequently, in each pair of piezo-resistors one (inner or outer) will have increased resistance while the other of the pair will have decreased resistance.

The circuit 30 comprises a first power supply 32 for providing the power for the Wheatstone Bridge. First power supply 32 provides—in this embodiment—a supply of approximately 3 V, and could be in the form of a 3 V battery. It will be understood by those skilled in this art, however, that the strain gauge 10 could operate with a wide range of voltages, such as from 1 V or less up to the limit of the Si integrated circuit technology used to fabricate it.

The circuit includes second power supply 34 (in this case of approximately 0.6 V), connected to substrate pad 36, to reverse bias the piezo-resistors to wafer (or well) junction. It will be appreciated that other bias voltages can be used; in general, this bias is set to be as large as possible relative to the voltage that is used to do the measurements (see below). Also, in this embodiment the substrate is positively biased, owing to the particular doping of the piezo-resistors; with alternative doped piezo-resistors, the bias may therefore be negative.

The bias is provided because the piezo-resistors are doped silicon in the oppositely doped silicon wafer (or it could be a specially doped well). Thus, the boundary from a piezo-resistor to the wafer (or well) thus constitutes a diode, which is reverse biased so that the current stays in the piezo-resistor.

Second power supply 34 could be, for example, in the form of a 1.5 V battery with two 100 kΩ resistors connected in series across it and a resulting centre point (at 0.75 V) used to bias the substrate.

In one alternative arrangement, the substrate of the strain gauge 10 is connected directly to the positive terminal of the second power supply 34, although this might lead in some cases to voltage modulation effects in the piezo-resistors 22a, b, 24a,b. The extent to which the diode (referred to above) is reverse biased affects the resistance of the diode owing to depletion of current carriers. If the diode is just connected to the positive rail, the voltage drop down of the piezo-resistors will give a reverse bias. However, as this changes (owing to changes in strain) there may be a secondary affect due to changed bias and depletion of the current carriers. Thus, it may be beneficial to have a strong reverse bias to reduce this effect. Also, changing the reverse bias could be used as a fine tuning technique, so it is envisaged that the circuit 30 could profitably include a mechanism for controlling the bias and hence act as a compensation system.

Between the second power supply 34 and the substrate is optionally located a first resistor R1, to limit current if the second power supply 34 cannot be current limited. As there should be very little current, R1 in this embodiment is approximately 100 kΩ, though the precise value is not critical. Between first resistor R1 and the substrate is a first ammeter mA1, for checking that there is not any excess current flowing. Consequently, this milliammeter should read close to zero.

A second current limiting resistor R2 and a second ammeter mA2 are connected in series between the first power supply and the first pair of piezo-resistors 22a,b. Resistor R2 is used during set up, and possibly during a first set of measurements. Resistor R2 has a resistance of approximately 4.7 kΩ, which limits the current to at most 0.6 mA. Resistor R2 could be shorted out for most of the measurements to ensure a constant excitation voltage.

Second ammeter mA2 monitors the total current through the Wheatstone Bridge.

Piezo-resistors 22a and 24b and piezo-resistors 22b and 24a are connected to respective terminals of a differential amplifier 36. The differential amplifier 36 thus takes the voltages from the midpoints of the Wheatstone Bridge. The output of the differential amplifier 36 is then input into a chart recorder or some other data acquisition system (not shown) that accepts differential floating inputs. The advantage of the Wheatstone Bridge is that it relies on the relative resistance of the two pairs of resistors and hence is relatively unaffected by changes in absolute resistance (e.g. due to heat) because the piezo-resistors will behave similarly in response to changed conditions.

Tensile and compressive stresses are distinguishable, as the potential across differential amplifier 36 when the gauge 10 is under tension will be of opposite polarity to that when the gauge 10 is under compression.

The resistances used in gauge 10 are of the order of ten thousand ohms, compared with three hundred and fifty ohms typical of existing devices, which requires significantly less power. Further, the gauge 10 is preferably formed as an integral silicon structure, which ensures that each piezo-resistor experiences the environmental conditions (including most particularly temperature) and so closely maintain the same relative electrical resistance.

Strain gauge 10 optionally includes additional piezo-resistors 42a,b and 44a,b of the same characteristics as piezo-resistors 22a,b and 24a,b in the annulus 14. They are fabricated on the silicon frame 12 so will not be exposed to the strain that piezo-resistors 22a,b and 24a,b experience. Piezo-resistors 42a,b and 44a,b can thus be used as controls to compensate for thermal affects.

It will be understood that the measurement circuit 30, as well as the circuitry that processes the outputs of circuit 30 (together with any other desired integrated circuit functions), can be included on the strain gauge 10. Further, the gauge 10 is preferably formed from the same material (i.e. silicon wafer) as used for implementing signal conditioning.

The gauge 10 can be bonded to the surface of the structure being tested at two (or, in other embodiments, more) points. The load path (or paths) connecting these points do not take the most direct path (thus (a) reducing stiffness to minimise attachment stress, and (b) separating the stress into in phase and antiphase components).

Further, strain gauge 10 should provide a higher level of compliance than existing devices, which is of particular importance when attached to steel.

In order to facilitate the bonding of the load points to the structure to be monitored, an electrical connection can be run to exposed conducting structures on the load point pads so that material (for example, metal) can be electro-deposited onto the load point pad (for example, by electroplating a metal). This permits, advantageously, the in-situ fabrication of load points that are slightly proud of the surface of the sensor and silicon frame to make it easier to attached the load points to the surface being monitored and not inadvertently come into contact with other parts of the structure. A strain gauge with such load point pads can be potted in a compliant polymer, leaving the faces of the load point pads exposed so that the whole device could bonded to the surface of a structure while ensuring that the load is transmitted substantially into the load point pads and to the load points on the strain sensors.

In addition, the entire silicon wafer can be processed to electro-deposit pads on the load points. It will be understood by those skilled in the art that it is desirable (though not essential) to fabricate the electronics to control this process on the wafer itself; doing so is expected to afford more uniform results for all of the devices across the wafer.

EXAMPLE

A strain gauge was constructed according to the embodiment of FIGS. 1 and 2, and tested with a circuit comparable to that of FIG. 3. Zero strain resistance was approximately 10 k$\Omega$, and total excitation current 200 µA (100 µA per arm of the bridge). This corresponds to approximately 2 V excitation voltage. Thus, the total power in the example was 400 µW or 100 µW per resistor.

Figure 4:
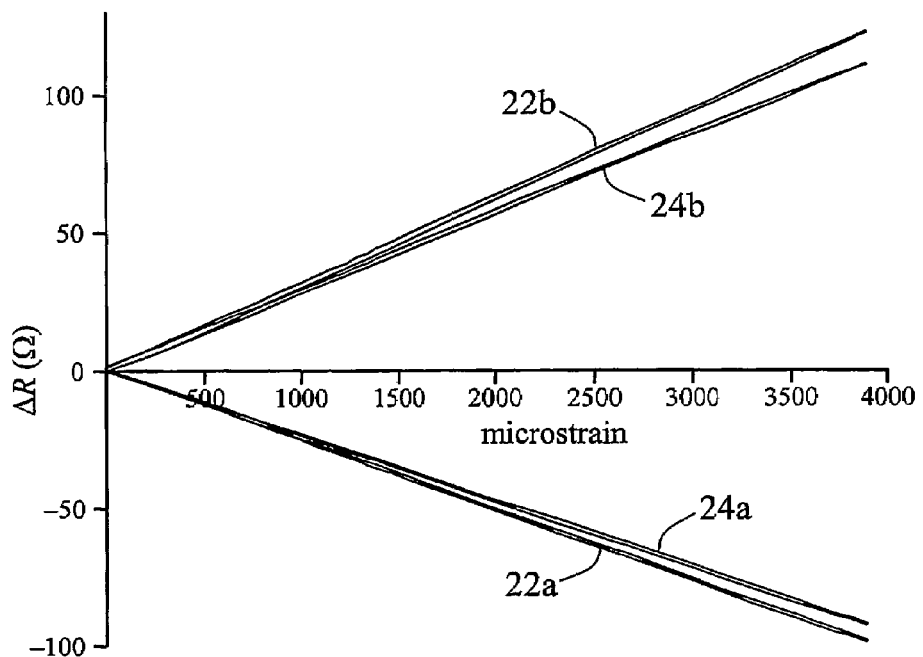
FIG. 4 is a plot of change in resistance $\Delta R(\Omega)$ as a function of microstrain for a strain gauge constructed according to the embodiment of FIGS. 1 and 2.

FIG. 4 is a plot of change in resistance $\Delta R(\Omega)$ as a function of microstrain. The microstrain increased from zero to approximately 3890 and then decreased back to zero. Thus, there are two curves in the plot for each of the four piezo-resisters, which have been labelled in accordance with FIGS. 2 and 3. The resistance increases for two piezo-resistors ($22b$, $24b$) and decreases for the other two piezo-resistors ($22a$, $24a$) because the former two were placed under tension and latter two under compression.

It should be noted that the effective gauge factor for a single piezo-resistor in the silicon annulus is lower than the gauge factor that one would obtain if the piezo-resistor were exposed in isolation to the same strain. That is, the piezo-resistors do not see the entire strain that is applied at the load points of the silicon ring. This is due to the geometry of the gauge and the use of thin tethers to attach the strain sensing element to the rest of the silicon structure, which increases compliance but reduces strain at the measurement points, viz. the locations of the piezo-resistors. For a $\Delta R$ of 100 $\Omega$, the strain was found to be approximately 3000 microstrain, hence:

$(\Delta R/R_0)/(\Delta L/L_0)=(100/10000)/0.003=3.3$.

This is not much greater than a standard metal foil strain gauge. A change in resistance of 100 $\Omega$ corresponds to a voltage change of around 0.01 V for a single piezo-resistor at around 3000 microstrain. A standard 120 $\Omega$ metal foil strain gauge with a gauge factor of 2 gives a resistance change of around 120×2×3000×1/1000000=0.72 $\Omega$. To obtain the same voltage change for a standard metal foil gauge as is obtained with the piezo-resistors requires a current of about 14 mA and thus an excitation voltage of around 1.7 V. The power in a single metal foil gauge would thus be around 23 mW, which is about 230 times higher than the piezo-resistors in this embodiment. By a similar calculation a 350 $\Omega$ metal foil strain gauge would require around 80 times the power.

Figure 5:
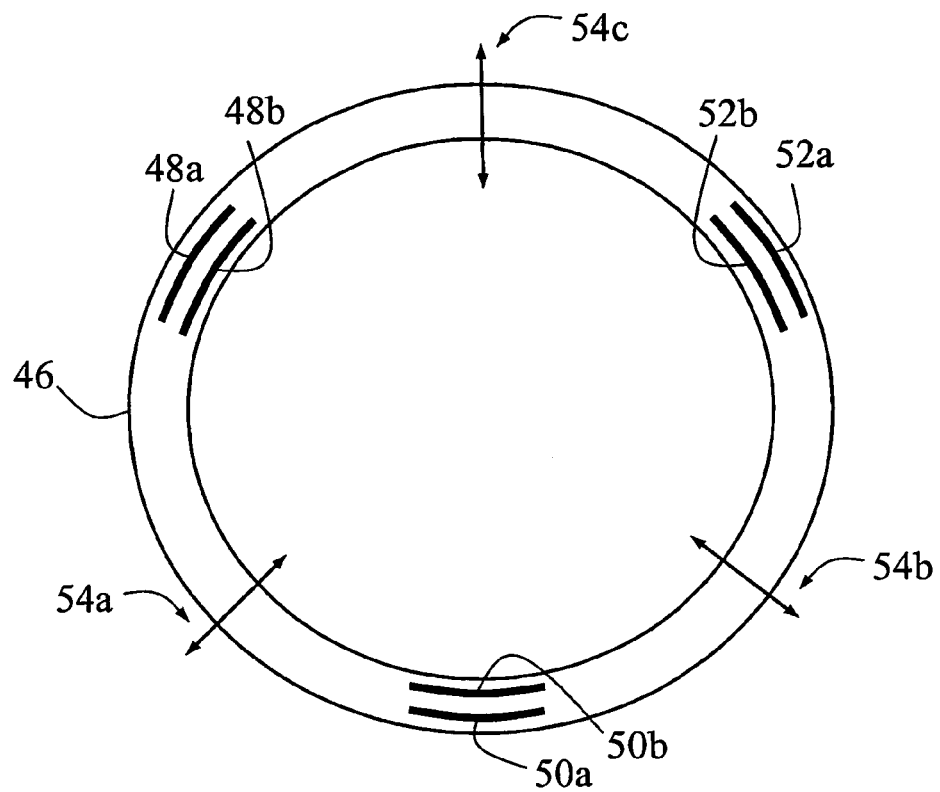
FIG. 5 is a schematic view of a biaxial strain gauge according to a second embodiment of the present invention.

Fabrication of the strain sensitive elements is not restricted to the configuration of FIG. 2, viz. with pairs of elements diagonally opposite each other so that the gauge is uniaxial. FIG. 5 is a schematic view of a strain sensing element in the form of silicon annulus 46 according to a second embodiment of the present invention; silicon annulus 46 has three equally spaced pairs of piezo-resistors $48a,b$, $50a,b$ and $52a,b$ and three load points $54a,b,c$. Each load point $54a,b,c$ is located between a respective pair of piezo-resistors pairs.

Silicon annulus 46 forms the strain sensing element of a strain gauge otherwise comparable to that shown in FIG. 1.

In this embodiment, the three groups of paired piezo-resistors $48a,b$, $50a,b$ and $52a,b$ make the silicon annulus 46 sensitive to biaxial strains. In a further alternative, three groups of four (rather than two) piezo-resistors could be located around the silicon annulus 46, possibly configured as a bridge. Other configurations such as three half bridges are possible or configurations with still different numbers of piezo-resistors.

Figure 6B:
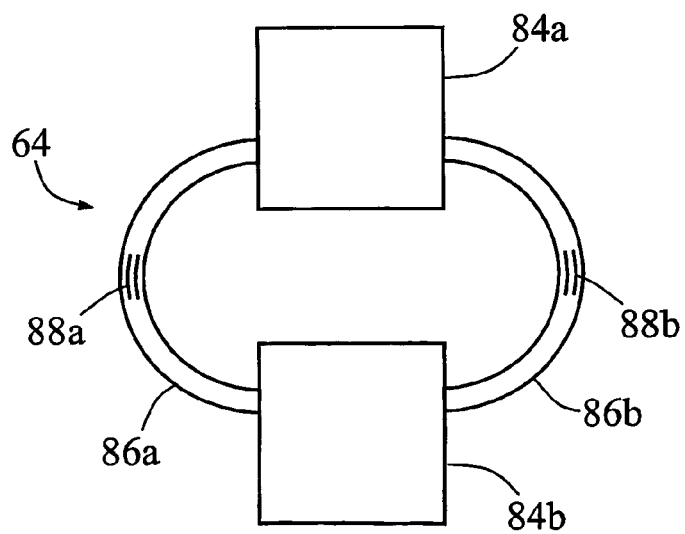
FIG. 6B is a detail of the strain gauge of FIG. 6A.
Figure 6A:
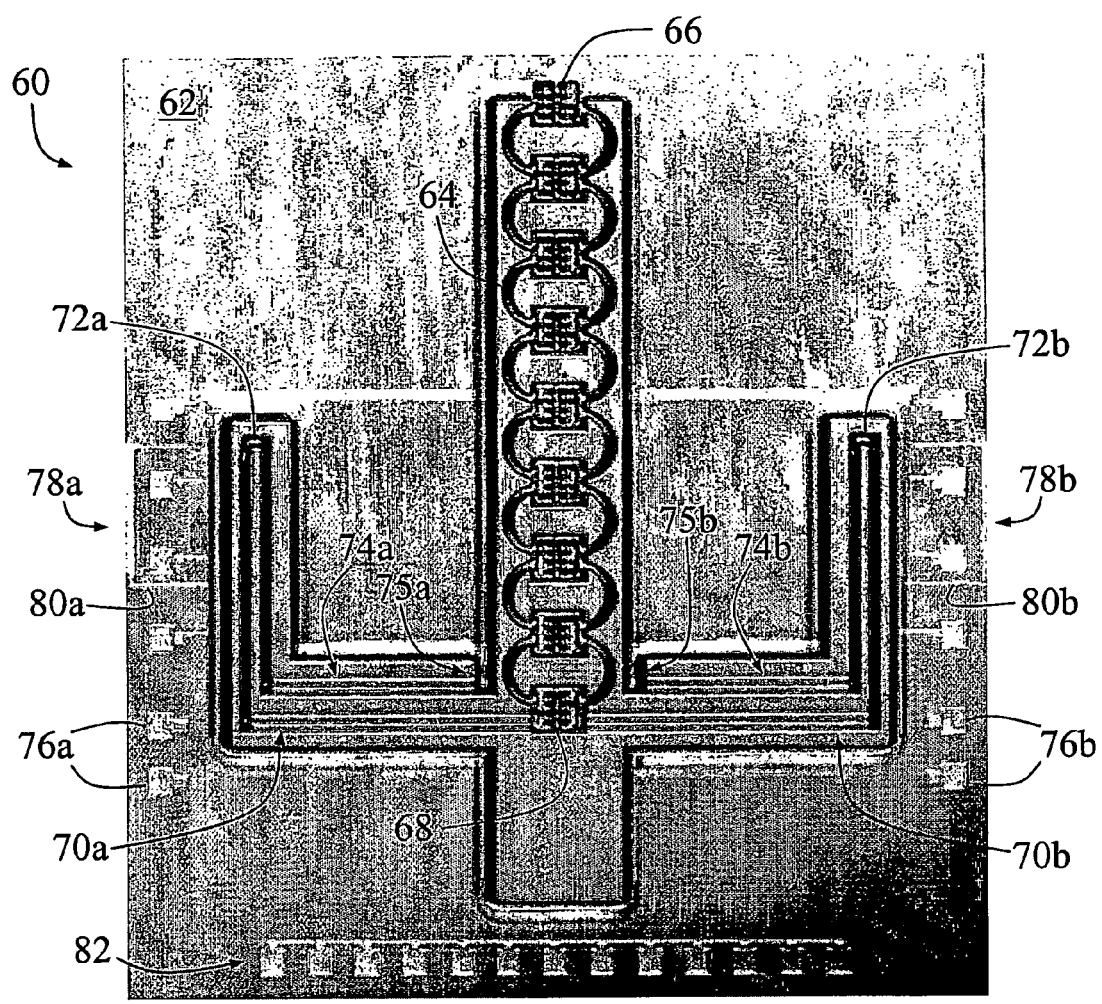
FIG. 6A is a photograph of an elongate strain gauge according to a third embodiment of the present invention.

FIG. 6A is a photograph of a strain gauge 60 according to yet another embodiment of the present invention, which includes a silicon frame 62 that provides a base structure and a series of eight silicon annuli 64 connected in an essentially linear fashion (and vertically in this view) by means of rectangular junctions. Gauge 60 thus comprises an extended gauge with load points along the length of the gauge, viz. at the junctions.

The uppermost (in this view) junction 66 forms a part of the silicon frame 62, while the lowermost junction 68 (in this view) is connected to two groups $70a$, $70b$ of three thin, flexible silicon strips extending horizontally (in this view) from lowermost junction 68. Each of the two groups of silicon strips meets, at its end remote from junction 68, a respective silicon arm $72a$, $72b$ that runs first vertically (in this view), then doubles back and downwardly to meet a respective further group $74a$, $74b$ of three silicon strips that extend (in this view) horizontally back to the silicon frame 62 at respective points $75a$, $75b$. All of the annuli 64, their load points at the junctions (such as uppermost junction 66 and lowermost junction 68), groups of silicon strips $70a$, $70b$ and $74a$, $74b$ and silicon arms $72a$, $72b$ are situated in a machined well in the silicon frame 62 and have been released from the underlying silicon so that are free to move other than by being constrained at the uppermost junction 66 and at points $75a,b$ (viz. where the further groups $74a$, $74b$ each of three silicon strips meet the silicon frame 62). The machined well is fabricated at the same time as the annuli 64, the junctions/load points (tethers) and a selective etching process is subsequently used to release the structures from the bottom of the well.

Along the left and rights sides of the silicon frame 62 are respective pairs of pads $76a,b$ that form contacts to the silicon frame 62, which are used for applying the bias voltage.

Above these are, again on each side, four pads $78a,b$ which are where connections to the piezo-resistors are made.

The silicon frame 62 also has thin lines $80a,b$ from the frame's left and right sides (respectively) are where a voltage can be applied to electro-deposit metal or other electro-depositable substance (such as for electroplating) onto the load points so that bumps can be made proud of the silicon surface for attaching the load points to the structure to be monitored.

In addition, strain gauge 60 includes a row of twelve connected resistors 82 at the lower periphery (as seen in this view) of the silicon frame 62, to act as reference resistors.

FIG. 6B is a detail of the strain gauge 60, showing one of the silicon annuli 64 with adjacent junctions $84a$, $84b$. It will be seen that each annulus in fact comprises two semi-annuli $86a,86b$ that are both joined and separated by the adjacent junctions $84a,84b$. Each semi-annulus $86a,86b$ is provided with a set of piezo-resistors $88a,88b$.

Modifications within the scope of the invention may be readily effected by those skilled in the art. It is to be understood, therefore, that this invention is not limited to the particular embodiments described by way of example hereinabove. For example, depending on the application, the number of piezo-resistors between load points may be varied.

Further, any reference herein to prior art is not intended to imply that such prior art forms or formed a part of the common general knowledge.

The invention claimed is:

1. A strain gauge, comprising:
a silicon strain sensing element for sensing strain and having first and second load points;
wherein said strain sensing element includes a portion that couples said first and second load points along an indirect path, and has a pair of piezo-resistors located between said load points such that, when said strain sensing element is subjected to tension or compression at said load points that urges said first and second load points towards or away from each other, said portion respectively extends or bends, simultaneously subjecting a first of said pair of piezo-resistors to compression and a second of said pair of piezo-resistors to tension thereby inducing a change in relative resistance of said pair of piezo-resistors.

2. A strain gauge as claimed in claim 1, wherein said strain sensing element comprises a curved silicon member.

3. A strain gauge as claimed in claim 2, wherein said curved silicon member comprises a circular ring or annulus.

4. A strain gauge as claimed in claim 1, wherein the strain sensing element has a shape selected from the group of an ellipse, an oval, one or more curves with one or more straight portions, a "V" shape and a zig-zag member.

5. A strain gauge as claimed in claim 1, wherein the strain sensing element comprises two or more load points and respective sets of piezo-resistors between each respective pair of load points.

6. A strain gauge as claimed in claim 5, wherein the strain sensing element comprises a ring with two load points and two pairs of piezo-resistors.

7. A strain gauge as claimed in claim 5, comprising three load points and three pairs of piezo-resistors.

8. A strain gauge as claimed in claim 3, comprising a plurality of load points spaced substantially equidistantly around the perimeter of said ring or annulus.

9. A strain gauge as claimed in claim 1, comprising a plurality of strain sensing elements.

10. A strain gauge as claimed in claim 9, wherein each of said strain sensing elements include at least one load point coupled to a load point of another of said strain sensing elements.

11. A strain gauge as claimed in claim 9, comprising a plurality of strain sensing elements arranged linearly, each having a load point coupled to or common with a load point of any adjacent one or more of said strain sensing elements.

12. A strain gauge as claimed in claim 1, comprising a detector responsive to changes in the relative resistance of said pair of piezo-resistors.

13. A strain gauge as claimed in claim 1, wherein said strain sensing element is provided with two pairs of piezo-resistors, arranged so as to constitute a Wheatstone Bridge.

14. A strain gauge as claimed in claim 1, wherein the strain sensing element is provided with a plurality of pairs of piezo-resistors, arranged so as to constitute a Wheatstone Bridge, and the gauge includes a current or potential sensitive device arranged to respond to changes in the relative resistance of said piezo-resistors.

15. A strain gauge as claimed in claim 1, wherein said strain sensing element is connected to the load points by silicon tethers.

16. A strain gauge as claimed in claim 1, further including an external structure, a plurality of connection points and a plurality of compliant tethers, wherein said connection points comprise or are mechanically coupled to said load points, and said tethers are arranged to tether said connection points to said external structure with each of said connection points coupled to said external structure by at least one of said tethers to locate said strain sensing element within said external structure.

17. A strain gauge as claimed in claim 16, wherein said tethers are sufficiently compliant so that a load required to bend said tethers is small compared with a load required to distort said strain sensing element.

18. A strain gauge as claimed in claim 16, wherein said external structure comprises a silicon frame.

19. A strain gauge as claimed in claim 16, wherein said connections points comprise or are coincident with said load points.

20. A strain gauge as claimed in claim 16, wherein said tethers provide a platform for or constitute an electrical connection between said external structure and said strain sensing element.

21. A strain gauge as claimed in claim 16, wherein said tethers comprise silicon.

22. A strain gauge as claimed in claim 16, wherein said external structure includes other piezo-resistors fabricated on parts of said external structure so that said external structure can be used as a temperature sensor.

23. A strain gauge as claimed in claim 22, wherein said other piezo-resistors are used in temperature correction for the piezo-resistors of said strain sensing element.

24. A strain gauge as claimed in claim 23, comprising a voltage source for applying a bias voltage between said strain sensitive piezo-resistors of said strain sensing element and said external structure or a doped well in order to control response of said strain sensitive piezo-resistors.

25. A strain gauge as claimed in claim 24, including conductive tracks to said connection points so that material may be electro-deposited at said connection points to provide additional functionality at said connection points.

26. A strain gauge as claimed in claim 25, including material electro-deposited at at least one of said connection points to form a raised point at said respective connection point for bonding to an external structure for the purposes of monitoring strain in said external structure.

27. A strain gauge as claimed in claim 24, further comprising at least one electrical circuit fabricated on a wafer on which the strain gauge is manufactured to control processing of the wafer.

28. A strain gauge as claimed in claim 27, wherein said at least one electrical circuit controls processing of electro-deposition.

29. A strain gauge, comprising:
a silicon strain sensing element for sensing strain and having first and second load points;
an external structure;
a plurality of connection points; and
a plurality of compliant tethers;
wherein said strain sensing element includes a portion that couples said first and second load points along an indirect path, and has a pair of piezo-resistors located between said load points such that, when said strain sensing element is subjected to tension or compression at said load points, said portion respectively extends or bends subjecting a first of said pair of piezo-resistors to compression and a second of said pair of piezo-resistors to tension thereby inducing a change in relative resistance of said pair of piezo-resistors; and wherein said connection points comprise or are mechanically coupled to said load points, and said tethers are arranged to tether said connection points to said external structure with each of said connection points coupled to said external structure by at least one of said tethers to locate said strain sensing element within said external structure.

30. A strain gauge as claimed in claim 29, wherein said tethers are sufficiently compliant so that a load required to bend said tethers is small compared with a load required to distort said strain sensing element.

31. A strain gauge as claimed in claim 29, wherein said external structure comprises a silicon frame.

32. A strain gauge as claimed in claim 29, wherein said connections points comprise or are coincident with said load points.

33. A strain gauge as claimed in claim 29, wherein said tethers provide a platform for or constitute an electrical connection between said external structure and said strain sensing element.

34. A strain gauge as claimed in claim 29, wherein said tethers comprise silicon.

35. A strain gauge as claimed in claim 29, wherein said external structure includes other piezo-resistors fabricated on parts of said external structure so that said external structure can be used as a temperature sensor.

36. A strain gauge as claimed in claim 35, wherein said other piezo-resistors are used in temperature correction for the piezo-resistors of said strain sensing element.

37. A strain gauge as claimed in claim 36, comprising a voltage source for applying a bias voltage between said strain sensitive piezo-resistors of said strain sensing element and said external structure or a doped well in order to control response of said strain sensitive piezo-resistors.

38. A strain gauge as claimed in claim 37, including conductive tracks to said connection points so that material may be electro-deposited at said connection points to provide additional functionality at said connection points.

39. A strain gauge as claimed in claim 38, including material electro-deposited at at least one of said connection points to form a raised point at said respective connection point for bonding to an external structure for the purposes of monitoring strain in said external structure.

40. A strain gauge as claimed in claim 37, further comprising at least one electrical circuit fabricated on a wafer on which the strain gauge is manufactured to control processing of the wafer.

41. A strain gauge as claimed in claim 38, wherein said at least one electrical circuit controls processing of electro-deposition.

42. A strain gauge, comprising:

a plurality of strain sensing elements for sensing strain, each having respective first and second load points;

wherein each of said strain sensing elements includes a portion that couples said respective first and second load points along an indirect path, and a pair of piezo-resistors located between said load points such that, when said strain sensing element is subjected to tension or compression at said load points, said portion respectively extends or bends, simultaneously subjecting a first of said pair of piezo-resistors to compression and a second of said pair of piezo-resistors to tension thereby inducing a change in relative resistance of said pair of piezo-resistors; and wherein each of said strain sensing elements includes at least one load point coupled to or common with a load point of another of said strain sensing elements.

43. A strain gauge as claimed in claim 42, wherein said strain sensing elements are arranged linearly.

44. A strain gauge, comprising:

a silicon strain sensing element for sensing strain and having first and second load points;

wherein said strain sensing element includes a portion that couples said first and second load points along an indirect path, and has a pair of piezo-resistors located between said load points such that, when said strain sensing element is subjected to tension or compression at said load points, said portion respectively extends or bends, simultaneously subjecting a first of said pair of piezo-resistors to compression and a second of said pair of piezo-resistors to tension thereby inducing a change in relative resistance of said pair of piezo-resistors; and wherein said strain sensing element is connected to the load points by silicon tethers.

45. A strain gauge as claimed in claim 1, wherein said strain sensing element is substantially planar and said strain gauge is adapted to gauge a load parallel to or co-planar with said strain sensing element.

* * * * *